United States Patent [19]

Guerin

[11] Patent Number: 4,606,239

[45] Date of Patent: Aug. 19, 1986

[54] LOCKING AND UNLOCKING DEVICE FOR A GYROSCOPIC ROTOR

[75] Inventor: Jacques C. Guerin, Saint-Denis, France

[73] Assignee: Societe d'Etudes et de Realisations Electroniques, France

[21] Appl. No.: 470,921

[22] Filed: Mar. 1, 1983

[30] Foreign Application Priority Data

Jun. 24, 1982 [FR] France .................. 82 11049

[51] Int. Cl.⁴ ............................................. G01C 19/26
[52] U.S. Cl. ......................................... 74/5.12; 74/5.1
[58] Field of Search .................. 74/5.1, 5.12, 5.14

[56] References Cited

U.S. PATENT DOCUMENTS

| 2,921,472 | 1/1960 | Friedman et al. | 74/5.1 X |
| 2,996,921 | 8/1961 | Hirsch | 74/5.1 |
| 3,247,726 | 4/1966 | East et al. | 74/5.12 |
| 3,270,568 | 9/1966 | Moravek et al. | 74/5.12 |
| 3,299,718 | 1/1967 | East | 74/5.12 |
| 3,434,355 | 3/1969 | Brastow et al. | 74/5.12 |

FOREIGN PATENT DOCUMENTS

| 211412 | 1/1957 | Australia | 74/5.12 |
| 71-14950 | 12/1972 | France . | |
| 76-07086 | 10/1977 | France . | |
| 159567 | 12/1979 | Japan | 74/5.1 |

Primary Examiner—Rodney H. Bonck
Attorney, Agent, or Firm—McGlew and Tuttle

[57] ABSTRACT

The invention relates to a locking and unlocking device for a gyroscopic rotor which is mounted through the intermediary of an internal cardan (5) placed at the end of a shaft (4) which receives a screwthreaded bushing (10) which is capable of being screwed onto this shaft and into the rotor (3) in order to make the assembly of rotor (3), shaft (4) and bushing (10) integral and hence to isolate the internal cardan (5) from the forces exerted upon the rotor when the latter is in the "locked" position. The bushing (10) is caused to unscrew by a spiral spring (15) to place the rotor (3) in the "unlocked" position.

8 Claims, 4 Drawing Figures

LOCKING AND UNLOCKING DEVICE FOR A GYROSCOPIC ROTOR

BACKGROUND OF THE INVENTION

The present invention relates to improvements made in locking and unlocking devices for gyroscopic rotors for appliances used as detector elements of a piloting and guiding system for missiles or projectiles, with very high initial acceleration, of the type launched by mortars or guns. These gyroscopic appliances are used as angular measurement pickups or again as aim stabilizers for the self-directors of these missiles or projectiles.

The gyroscopic appliances to which the present invention is applicable are required to exhibit the following features in their construction and in their use: their rotor is mounted on an internal cardan, at the launching of the missile the rotor is anchored and it is set in rotation only below a certain level of deceleration of the missile or at the end of a definite time, after the firing of the missile.

Devices are known which permit the sensitive bearings of gyroscopes to be isolated from the forces applied by the accelerations during the launch phase of the missile, by the movement of the gyroscopes which applies its rotor and its frames to fixed stops as described in French Certificate of Addition 71-14950 filed on Apr. 27, 1971 or in French Pat. No. 76-07086 filed on Mar. 12, 1976. Such devices therefore compel the gyroscopic rotor and its frames to move relative to the housing in the locking phase, then to return to its initial position for the unlocking. But the major disadvantage is that such devices are difficult to transport to so-called internal cardan gyroscopes.

SUMMARY OF THE INVENTION

In order to overcome these disadvantages, the invention relates to a locking and unlocking device for a rotor mounted with two degrees of freedom through the intermediary of an internal cardan inside the rotor, carried at the end of a shaft which, being screwthreaded and fixed to a housing, receives a screwthreaded bushing which screws onto it and into the rotor in order to make this "rotor, shaft and bushing" assembly integral and hence to isolate the internal cardan placed between the shaft and rotor from the forces exerted on the rotor when the latter is in the "locked" position.

In order to favor this isolation, in another embodiment the internal cardan is further protected by elastic rings.

According to the invention, the screwthreaded bushing is adjoined by a drive means which, at the required time, unscrews and withdraws the screwthreaded bushing, thus releasing the gyroscopic rotor, "unlocked" position.

In a preferred embodiment of the invention, the drive means is a spiral spring.

The following description, given with reference to the accompanying drawings given by way of example and not implying a limitation, will permit a better understanding of how the invention may be realized.

DESCRIPTION OF THE PREFERRED EMBODIMENT

Figure 1:
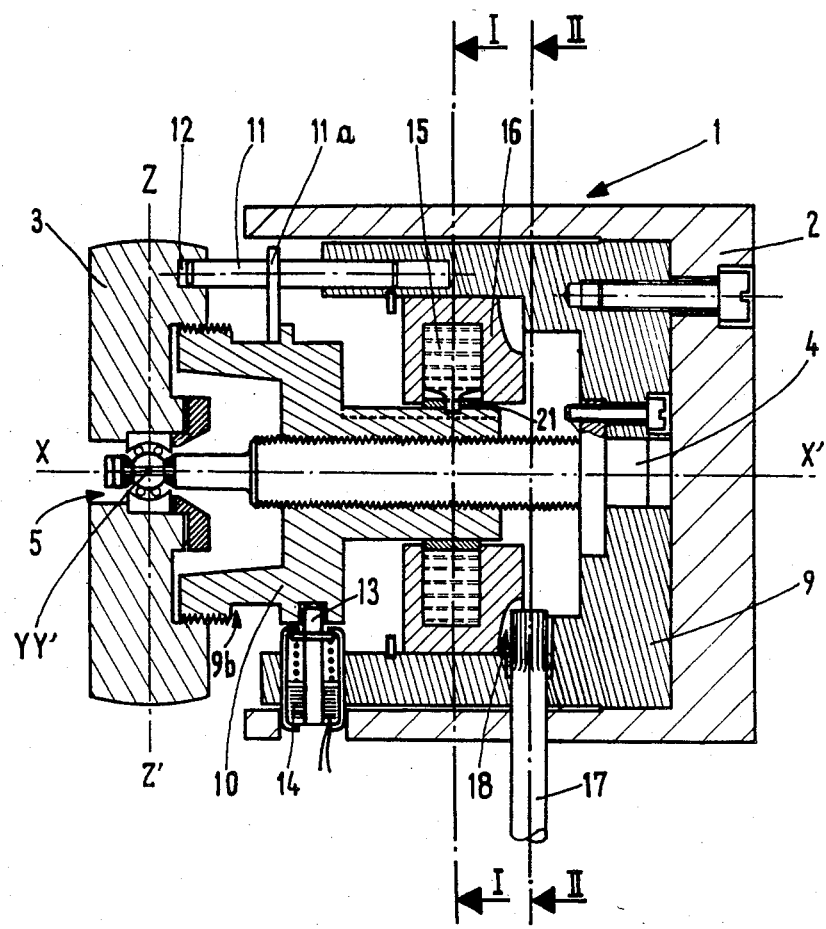
FIG. 1 illustrates, in a longitudinal section through a vertical plane, a locking and unlocking device for the rotor of a gyroscope according to the invention, shown in the locked position.

In FIG. 1, the locking and unlocking device 1 enclosed in a case 2 is illustrated in the locked position of a rotor 3 for a gyroscope mounted at the end of a shaft 4 through the intermediary of an internal cardan 5 represented by a ball joint in the drawing. When the device 1 is in the unlocked position, the rotor 3 is free and it can swivel at the end of the shaft 4 about its longitudinal axis XX'; the rotor 3 is set in rotation by means not shown in the drawing, which may be electrical, pneumatic or mechanical means, as known.

Figure 2:
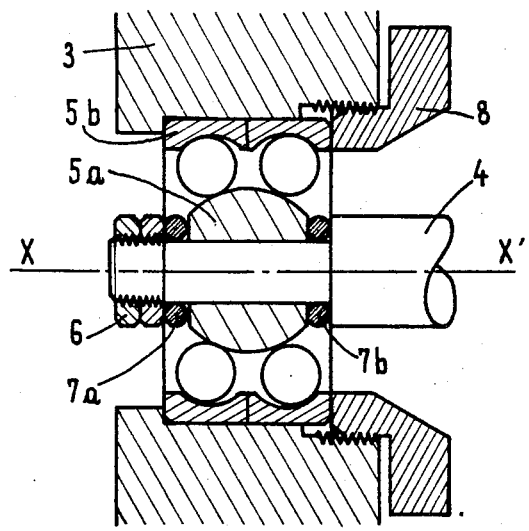
FIG. 2 shows, on a larger scale, a detail of FIG. 1.

The ball joint 5 is illustrated in detail, on a larger scale, in FIG. 2. It consists of an inner race 5a, of balls and of an outer race 5b. The inner race 5a is mounted on a shouldered axis machined at the end of the shaft 4. It is locked by a nut and check nut 6. Two elastic rings 7a and 7b are inserted between the inner race 5a and the shoulder of the shaft 4 and the nut 6, and they may be in the form of toric seals. Because of rings 7a, 7b there is some axial resilience in the connection between inner race 5a and shaft 4. As for the outer race 5b, it is housed in a bore of the rotor 3 and is anchored in the latter by a screwthreaded ring 8.

The shaft 4 is fixed relative to an element 9 anchored in the housing 2. The shaft is partly screw-threaded with a pitch (p) and it receives a screw-threaded bushing 10 which can advance towards the rotor 3 or recede according to the direction of its rotary drive movement. This screwthreaded bushing 10 has a second screwthread, of equal pitch (p), which screws into the rotor 3. These two screwthreads are preferably of trapezoidal shape. A pin 11, partly housed in the element 9, is moved longitudinally and parallel to the axis XX' to accompany the movement of the screw-threaded bushing 10, so as to engage in an orifice 12 made in the rotor 3. For this purpose the pin 11 is fitted with a shoulder 11a captive in a groove of the screwthreaded bushing 10. The flanks of this groove bearing against the shoulder cause the pin 11 to follow the longitudinal movement of the screwthreaded bushing 10. The screwing of the screwthreaded bushing 10 into the rotor 3 is limited by an axle 13 which engages in an orifice, machined in the bushing 10, when it appears opposite this axle towards the end of the screwing of the screwthreaded bushing 10.

The axle 13 may be, as shown in the drawing, the core of an electromagnet 14 which, when energized, attracts said axle and releases it from the screwthreaded bushing 10. The screwthreaded bushing 10, being released is then caused to unscrew very rapidly from the rotor 3, entraining the pin 11 in its receding movement. The pin 11 is released from the gyroscopic top 3 only after the separation of the screwthreaded bushing 10 from the rotor 3 so as not to apply any perturbing torque which would modify the position of the latter.

Figure 3:
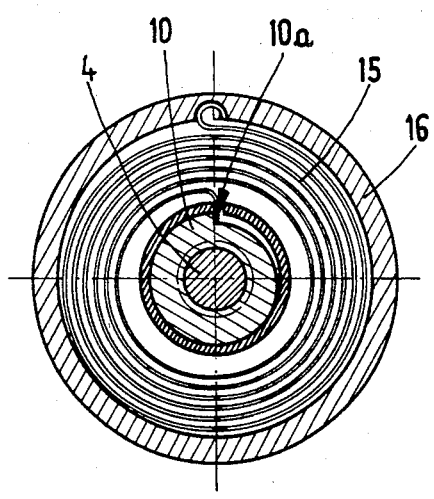
FIG. 3 shows a section made along the line I—I of the object of FIG. 1.

In a preferred embodiment, a spiral spring 15, the end of the outer turn of which is fixed to a barrel 16, has its bent inner turn anchored by the notch 10a made in the screwthreaded bushing 10, as shown in FIG. 3, when said screwthreaded bushing is screwed into the gyroscopic rotor 3.

Figure 4:
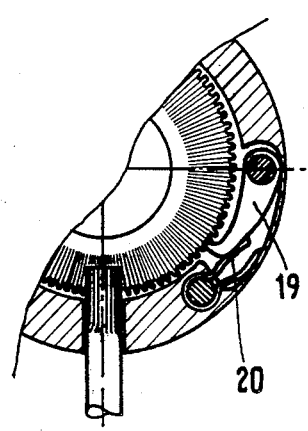
FIG. 4 shows a partial section along the line II—II of the object of FIG. 1.

The spiral spring 15 is wound up by a key 17 which meshes with a tooth system 18 cut on the circumference of the barrel 16. When once the spiral spring 15 has been wound up, the anchorage of the barrel 16 in the element 9 is obtained, as shown in FIG. 4, by a pawl 19 which engages, by the action of a spring 20, into a gap of the tooth system 18 preventing any movement in the opposite direction. A sleeve 21 may be mounted on the screwthreaded bushing 10 to prevent the inner turn of the spring 14, when wound up, from clinching the screwthreaded bushing 10.

What is claimed is:

1. A locking and unlocking device for the rotor of a gyroscope enclosed in a housing and rotatably mounted on an internal cardan carried at the end of a shaft fixed to said housing, comprising: a screwthread on said shaft, and a bushing having a first screwthread corresponding to that of said shaft and cooperating therewith and a second screwthread of the same pitch as said first screwthread and cooperating with a corresponding screwthread on said rotor, the arrangement being such that said bushing, when rotated, moves along said shaft between a position in which said second screwthread engages said screwthread of the rotor, and another position in which said second screwthread is disengaged from the screwthreaded of the rotor.

2. Device as claimed in claim 1, comprising driving means adapted to drive said bushing in rotation on said shaft to disengage the second screwthread of the bushing from the screwthread of the rotor.

3. Device as claimed in claim 2, wherein said driving means is in the form of a spiral spring.

4. Device as claimed in claim 1, wherein said internal cardan is mounted on the end of the shaft between elastic rings.

5. A locking device comprising:
a housing;
a shaft connected to said housing, said shaft having a longitudinal axis and a thread with a selected pitch on a portion thereof;
a cardan joint having an inner race connected to said shaft and an outer race rotatably mounted to said inner race about said axis of said shaft and about axes which are at an angle to said axis of said shaft;
a gyroscopic rotor connected to said outer race of said cardan joint for rotation therewith and for rotation with respect to said shaft, said rotor having a thread with a pitch equal to said thread on said shaft; and
a bushing having a first thread threadably engaged on said thread of said shaft and a second thread threadable onto said thread of said rotor, said bushing being movable in said housing and along said shaft with rotation of said bushing and for threadably engaging said second thread of said bushing with said thread of said rotor for locking said shaft, said bushing and said rotor together, said bushing being rotatable in an opposite direction for movement along said shaft to disengage said second thread thereof from said thread of said rotor.

6. A device according to claim 5, including drive means connected between said housing and said bushing for rotating said bushing.

7. A device according to claim 6, wherein said drive means comprises a spiral spring having an outer turn which is fixable with respect to said housing and an inner turn which is connectable to said bushing.

8. A device according to claim 5, wherein said shaft has an end with a shoulder and an end extension, said inner race being at least partly spherical and being engaged on said extension, a first elastic ring engaged around said extension between said inner race and said shoulder, a second elastic ring engaged around said extension and against said inner race at a location spaced from said shoulder, and a nut threaded onto said extension and pressing said inner race and said first and second elastic rings toward said shoulder.

* * * * *